United States Patent [19]
Jatteau et al.

[11] Patent Number: 4,881,171
[45] Date of Patent: Nov. 14, 1989

[54] SCINTILLATION CAMERA HAVING SIMPLIFIED ELECTRONIC CONTROL

[75] Inventors: Michel R. Jatteau; Pierre H. Lelong, both of Paris; Vincent Pauzat, Montgeron; Christian Plard, Rueil-Malmaison, all of France

[73] Assignee: U.S. Philips Corp., New York, N.Y.

[21] Appl. No.: 71,222

[22] Filed: Jul. 8, 1987

[30] Foreign Application Priority Data

Jul. 9, 1986 [FR] France ............................... 86 09986
Jul. 16, 1986 [FR] France ............................... 86 10326

[51] Int. Cl.$^4$ ........................... G01T 1/20; G01T 1/208
[52] U.S. Cl. ................................. 364/413.24; 250/369;
250/363.02
[58] Field of Search ........................... 250/363 S, 369;
364/414, 413.24

[56] References Cited

U.S. PATENT DOCUMENTS

| | | | |
|---|---|---|---|
| 4,151,416 | 4/1979 | Richey et al. | 250/363 S |
| 4,323,977 | 4/1982 | Arseneau | 250/369 X |
| 4,629,894 | 12/1986 | Lelong | 250/369 X |
| 4,692,890 | 9/1987 | Arseneau | 364/733 |

FOREIGN PATENT DOCUMENTS

2570507 3/1986 France.

OTHER PUBLICATIONS

European Patent Publication No. 252566, (Jan. 13, 1988), search report based on Application No. 87201285.

Primary Examiner—Clark A. Jablon
Attorney, Agent, or Firm—Paul R. Miller

[57] ABSTRACT

A scintillation camera, comprises the structure of a scintillation crystal (10), a collimator (20), a light guide (30), an array (50) of p photodetectors, p acquisition channels (60), and a processor (100) for supplying the coordinates $x_j$ and $y_j$ of a scintillation j and its associated energy $E_j$, and further comprises structure characterized in that:
(A) the p acquisition channels apply p digital signals to the input of the processor;
(B) the processor (100) itself comprises:
 (a) a bus for transferring the p digital signals;
 (b) a digital summing stage (200);
 (c) a scintillation processing stage; and
(C) a detection, sequencing and storage stage (400) which receives a signal which corresponds to the sum of the p output signals of the photodetectors, is provided in order to supply the various clock signals and the correction coefficients for the scintillation processing stage.

21 Claims, 15 Drawing Sheets

SCINTILLATION CAMERA HAVING SIMPLIFIED ELECTRONIC CONTROL

BACKGROUND

The invention relates to a scintillation camera, comprising a scintillation crystal which may comprise a collimator and which serves to convert each photon received into a scintillation, a light guide for coupling the crystal to the entrance window of an array of p photodetectors which serve to convert each scintillation into a current, p acquisition channels which receive the output signals of the photodetectors and which supply p characteristic electric signals which relate notably to the intensity of the scintillations and to the distance between the respective scintillation and each of the photodetectors, and a processor which serves to supply the coordinates $x_j$ and $y_j$ of a scintillation j and its associated energy $E_j$.

For the determination of the image of the radioactive distribution inside an organ, medical diagnostics utilizes inter alia the scintigraphy principle. This method is based on the introduction of a radioactive element into the organism of a patient which attaches itself more or less to given organs, depending on whether these organs are healthy or not. The measurement of the intensity of the gamma radiation emitted provides an indication of the distribution of the radioactive element in the organism and hence forms a diagnostic aid. A measurement of this kind is performed by means of a scintillation camera.

In conventional scintillation cameras, for example, Anger type cameras (the physician Anger was the first one to propose a scintillation camera whose principles are described in U.S. Pat. No. 3,011,057), the gamma rays which are representative of the radioactive distribution in the enviroment examined penetrate a scintillation crystal after having passed through a collimator. The scintillations thus produced in the crystal are subsequently detected by a series of photomultiplier tubes (for example, 37) after having passed through a light guide which provides optical coupling between the crystal and the tubes. These tubes are distributed in front of the optical block (crystal+light guide) so as to cover substantially the entire surface thereof and to convert the light energy of each scintillation occurring into a measurable electric signal.

Thus, with each photomultiplier tube there is associated an analog acquisition channel which successively provides amplification, integration and shaping of the signals supplied by the tube. The output signals $S_{ij}$ of the set of acquisition channels are applied to a processor which supplies, by estimation, the coordinates $x_j$ and $y_j$ of a scintillation j and its energy $E_j$ (the index i designates the relevant acquisition channel). The processor may comprise several types of calculation devices, but essentially two thereof are used, in practice, i.e. an arithmetical calculation device for determining the bary center.

In such an arithmetical calculation device, the quantities $x_j$, $y_j$, $E_j$ are given by the expressions:

$$x_j = \frac{X_j}{Z_j} \quad (1)$$

$$y_j = \frac{Y_j}{Z_j} \quad (2)$$

-continued $$E_j = \sum_{i=1}^{i=p} G_i S_{ij} \quad (3)$$

In these expressions:

$$X_j = \sum_{i=1}^{i=p} K_i S_{ij} \quad (4)$$

$$Y_j = \sum_{i=1}^{i=p} H_i S_{ij} \quad (5)$$

$$Z_j = \sum_{i=1}^{i=p} J_i S_{ij} \quad (6)$$

where the coefficients $G_i$, $K_i$, $H_i$, $J_i$ are weighting factors related to the position of the axis of each of the p photomultiplier tubes.

In such a logarithmic calculation device, the quantities $x_j$, $y_j$, $E_j$ are given by the expressions:

$$x_j = \frac{1}{a} \text{Log} \frac{X_j^+}{X_j^-} \quad (7)$$

$$y_j = \frac{1}{a} \text{Log} \frac{Y_j^+}{Y_j^-} \quad (8)$$

$$E_j = \sum_{i=1}^{i=p} G_i S_{ij} \quad (9)$$

$$X_j^+ = \sum_{i=1}^{i=p} K_i^+ S_{ij} \quad (10)$$

$$X_j^- = \sum_{i=1}^{i=p} K_i^- S_{ij} \quad (11)$$

$$Y_j^+ = \sum_{i=1}^{i=p} H_i^+ S_{ij} \quad (12)$$

$$Y_j^- = \sum_{i=1}^{i=p} H_i^- S_{ij} \quad (13)$$

The weighting factors are again related to the position of the axis of each of the p photomultiplier tubes.

Regardless of the arithmetic used, contemporary scintillation cameras generally comprise devices for calculating weighted sums which utilize resistance networks with associated summing amplifiers. In the cameras of this type it is not possible to execute calculations relating to a scintillation before the signals corresponding to the preceding scintillation have been set to zero, so that the maximum calculation speed is limited. In order to increase this speed, various solutions have already been proposed, for example, the reduction of the duration of the electric signals or the integration time by means of analog circuits. However, such a reduction could be achieved only at the expense of given intrinsic characteristics of the cameras, notably the spatial and the spectral resolution.

In a previous French Patent Application FR-A 2 552 233 Applicant has proposed a digital radiation measuring device in which it is no longer necessary for the electric signals to return to zero before each new measurement, which means that a partial pile-up of the detected scintillations (and hence of the electric signals or pulses corresponding thereto) is accepted.

It is the object of the invention to propose a novel scintillation camera which incorporates given elements of the above device which, however, are arranged partly within the p acquisition channels and partly within the processor and which has a simplified electronic design which allows for the A/D conversion and the subsequent digital integration of the signals to be performed by means of less accurate, and hence less expensive converters. This design also enables the execution of unpiling calculations by means of a limited number of processing circuits.

To achieve this, the scintillation camera in accordance with the invention is characterized in that:

(A) the p acquisition channels sample the output signals of the photodetectors, followed by the A/D conversion of the samples obtained and their summing, and apply p digital signals to the input of the processor;

(B) the processor itself comprises:
  (a) a bus for transferring the digital signals;
  (b) a digital summing stage, comprising four digital weighted sum forming devices which supply four digital signals $X_m$, $Y_m$, $Z_m$, $E_m$ on the basis of the output signals of the p acquisition channels;
  (c) a scintillation processing stage which includes unpiling calculation circuits and two dividers and which supplies the three coordinate and energy signals x, y, E on the basis of the signals $X_m$, $Y_m$, $Z_m$, $E_m$;

(C) a detection, sequencing and storage stage which receives a signal which corresponds to the sum of the p output signals of the photodetectors is provided in order to supply on the one hand the various clock signals for synchronizing the elements of the p acquisition channels and the elements of the processor, and on the other hand the correction coefficients for the scintillation processing stage.

For example, European patent application No. 0166169 describes a scintillation camera which realizes the A/D conversion only in the processor; this notably leads to the use of high-precision and components which are far more costly, i.e. with a ratio of at least 1:100.

BRIEF DESCRIPTION OF THE DRAWINGS

The particularities and advantages of the invention will become apparent from the following description, given by way of example, with reference to the accompanying diagrammatic drawings; therein.

Figure 1:
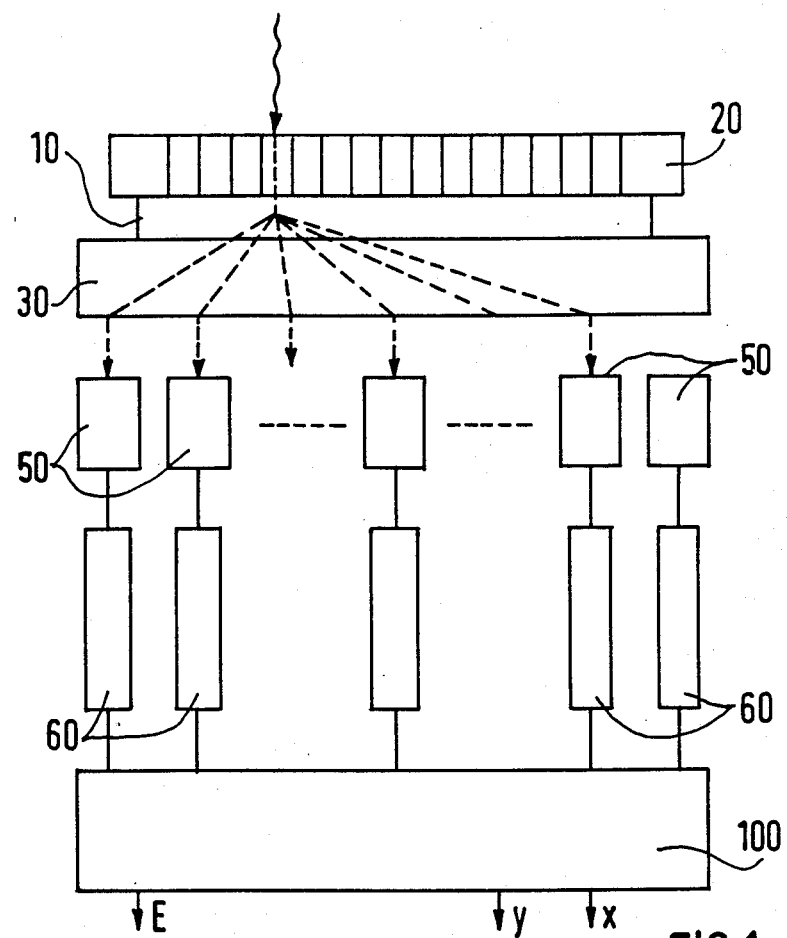
FIG. 1 shows a scintillation camera in accordance with the present state of the art.

The conventional scintillation camera shown in FIG. 1 comprises a scintillation crystal 10 which is provided with a collimator 20 and which is intended for converting each photon received into a scintillation. By a light guide 30, the crystal is coupled to the entrance window of an array of p photodetectors which are in this case formed by photomultiplier tubes 50. The tubes 50 convert each scintillation into a current which is then processed by p fully analog acquisition channels 60. The acquisition channels 60 realize notably the amplification, filtering, integration and shaping of the output signals of the photomultiplier tubes 50 and are followed by a processor 100 which supplies the coordinates $x_j$, $y_i$ and the energy $E_j$.

Figure 2:
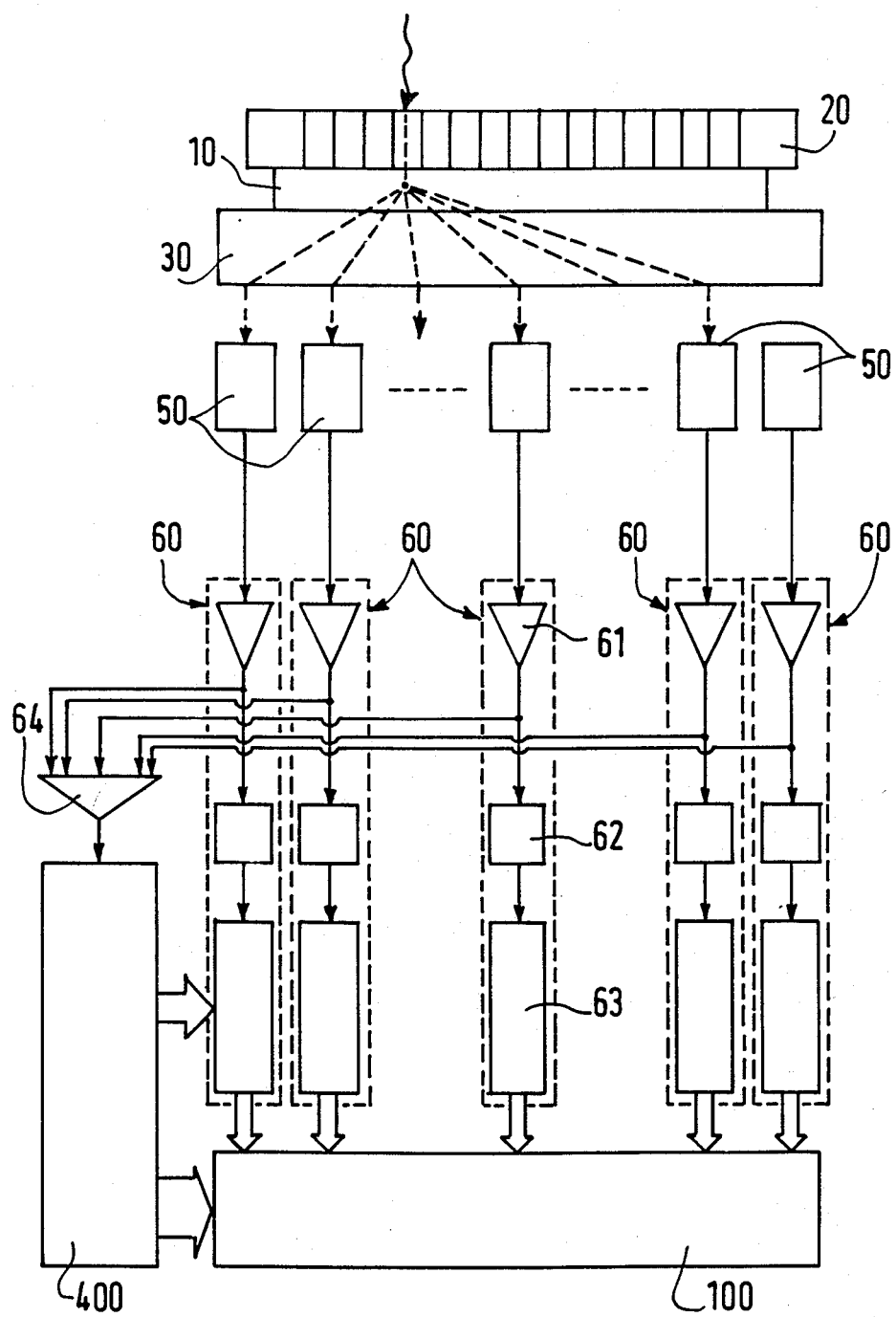
FIG. 2 shows a scintillation camera in accordance with the invention, respectively.

In the embodiment which will be described in detail hereinafter with reference to FIG. 2 which shows the modifications to the circuit diagram of FIG. 1 for a camera in accordance with the invention, the p acquisition channels 60 are no longer fully analog like in conventional cameras, but apply p digital signals $M_{i,j}$ (i=index varying from 1 to p) to the input of the processor 100. The p channel now successively provide the amplification, filtering and sampling of the output signals of the photomultiplier tubes 50 after the A/D conversion of the samples obtained and the summing of the digital samples. The value of the p digital signals is related to that of the output current of the tubes 50 and hence to a fraction of the intensity of the initial scintillation, but different in accordance with the pile-up rate of the scintillations (this fraction itself is related to the realization of the optical block and notably to the distance between the scintillation point and the axis of the tubes). If there were no pile-up, the value of each of these signals would be denoted as $S_{i,j}$; the estimation of these values in the presence of pile-up will be denoted in $\hat{S}_{i,j}$.

Figure 3:
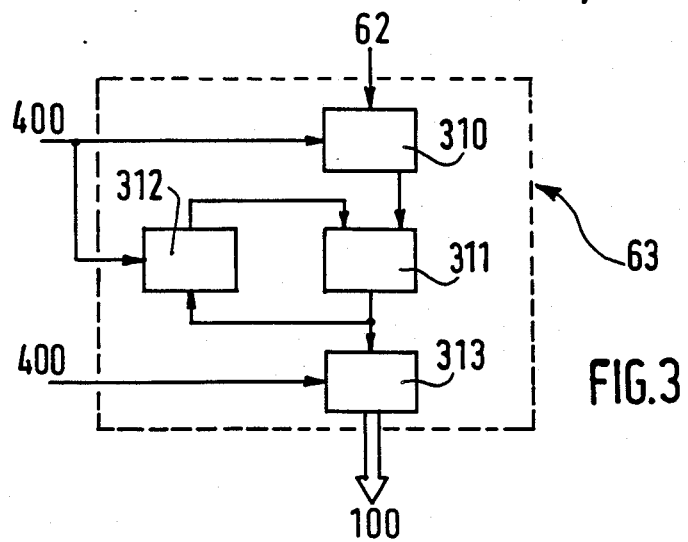
FIG. 3 shows an embodiment of the conversion and integration device of each of the p acquisition channels.

For realizing the above functions each of the p channels thus comprises a series connection of an amplification and filtering circuit 61 which receives the output signal of the corresponding tube 50, a time realignment circuit 62 which is followed by a conversion and integration device 63 which provides the successive sampling of the output signals of the corresponding circuit 62, the A/D conversion of the signals thus obtained, and the summing thereof. There is also provided an analog summing amplifier 64 whose p inputs receive the p output signals of the amplification and filtering circuits 61 and whose output signal is applied to a pulse-start detector which is situated in the detection, sequencing the storage stage 400 to be described hereinafter. The output signal of each of the p conversion and integration devices is applied to the processor 100, possibly via p FIFO memories which enable later operation at much lower frequencies thus by controlling the output of scintillations. This array of FIFO memories actually enables a reduction of the speed of later calculations and the slower rhythm thus obtained may be practically equal to the means arrival rhythm of the scintillations (for example, 2 microseconds for a mean rhythm of 500,000 scintillations per second) and no longer equal to the arbitrary arrival rhythm of the scintillations (approximately 0.2 microseconds in the former case). Each of the the conversion and integration devices 63 used herein is equivalent to that disclosed in French patent application FR-A 2 552 233 and comprises, in the embodiment shown in FIG. 3, a sampling and D/A conversion circuit 310 which is followed by an adder 311. To the output of the adder 311 there are connected to a first register 312 for storing the output signal of the adder, the output signal of the register being applied to a second input of the adder, and a second register 313 for storing the output signal of the adder, the output signal of the second register being that of the conversion and integration device which thus realizes a cumulative addition and the corresponding storage as the samples arrive. These operations are performed under the control of the detection, sequencing and storage stage 400 to be described hereinafter.

The processor 100 receives the p output signals of the acquisition channels and comprises various calculation devices for distinctly determining the coordinates $x_j$, $y_j$ and the energy $E_j$ of each scintillation j, either by means of the relations (1) to (6) in the case of an arithmetical calculation device or by means of the relations (7) to (13) in the case of a logarithmic calculation device.

Figure 4:
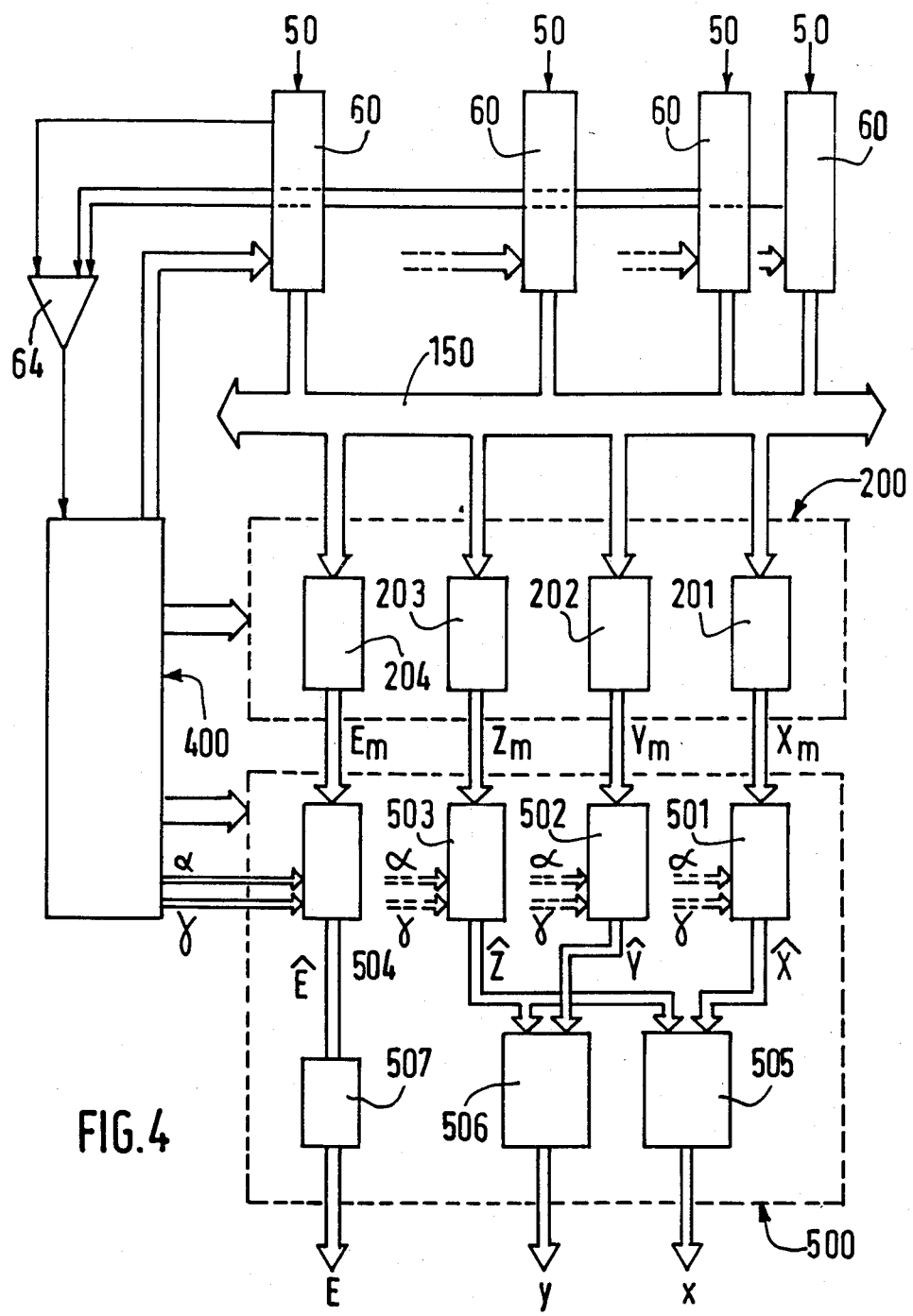
FIG. 4 shows a first embodiment of the processor of a scintillation camera in accordance with the invention.
Figure 5:
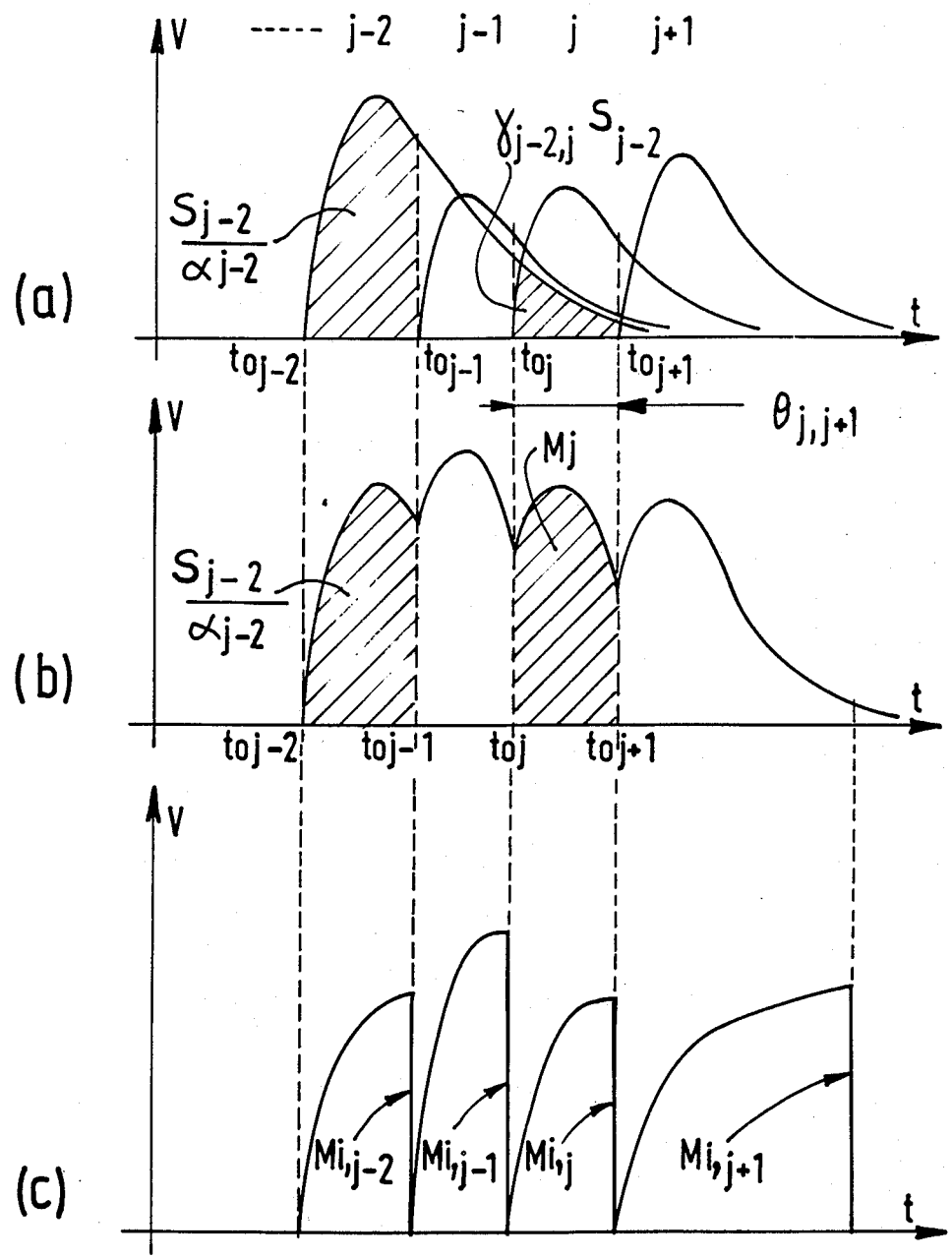
FIGS. 5a to 5c show the individual signals corresponding to approximated scintillations causing a partial pile-up, the overall signal resulting from this pile-up, and the shape of the signal representing the measured value resulting from the summing of the samples during the time interval $\theta_{j, j+1}$ for the channel i (this value having been measured at the instant $t_{o,j+1}$), respectively.

More precisely, the processor 100 as shown in FIG. 4 is constructed as follows in the case of an arthmetical calculation device. It comprises first of all a bus 150 for transferring the digital signals $M_{i,j}$ present at the output of the p acquisition channels. If for one of these channels, for example the channel i, the individual analog signals associated with several scintillations wich are grouped in time (FIG. 5a) and the resultant pile-up signal of these individual signals are represented (FIG. 5b), it appears that the scintillation j is disturbed upstream by several scintillations j−1, j−2, etc. If $\alpha_j$ and $\gamma_{k,j}$ are coefficients for correction by extrapolation and interpolation, respectively, which can be determined from the known mean shape, as a function of time, of the pulses corresponding to a detected scintillation and from the measurement of the period $\theta_{j,j+1}$ between $t_{o,j}$ and $t_{o,j+1}$, if k is successively equal to j−1, J−2, . . . j−q, and if the signals $S_{ik}$ represent for these respective values of k the values corrected for pile-up effects which would be supplied by the digital acquisition channel in reaction to the scintillations j−1, j−2, . . . , j−Q, the digital signals obtained at the output of the acquisition channels will be shaped as:

$$M_{i,j} = \frac{\hat{S}_{ij}}{\alpha_j} + \sum_{k=j-1}^{k=j-q} \gamma_{k,j} \hat{S}_{i,k} \tag{14}$$

where $M_{i,j}$ represents the value measured at the instant $t_{o,j+1}$, resulting from the summing of the samples during the time interval $\theta_{j,j+1}$ for the channel i. The shape of the signal $M_{i,j}$ is shown in FIG. 5c.

The processor finally comprises, connected to the output of the transfer bus 150, a digital summing stage 200 which itself is composed for four digital weighted sum forming devices 201 and 204 as shown in FIG. 4. The four devices 201 to 204 form the following weighted sums:

$$X_{m,j} = \Sigma_i K_i M_{ij} \tag{15}$$

$$Y_{m,j} = \Sigma_i H_i M_{ij} \tag{16}$$

$$Z_{m,j} = \Sigma_i J_i M_{ij} \tag{17}$$

$$E_{m,j} = \Sigma_i G_i M_{ij} \tag{18}$$

respectively, where the coefficients $K_i$, $H_i$, $J_i$, $G_i$ are the digital expressions of the weighting factors defined in accordance with the expressions (3) to (6) (for an arithmetical calculation device). Each of the digital weighted sum forming devices is, for example of the type multiplier-accumulator TDC 1009 (marketed by TRW, La Jolla, CA 92038, USA), one of the inputs of which receives the corresponding output signal of the bus 150, its other input receiving the weighting coefficients (in digital form), which are stored in an auxiliary memory. When this type of multiplier-accumulator is effectively used, the auxiliary memory must be synchronized with the operation of the complete processor and may be incorporated, for example in the detection, sequencing and storage stage 400 to be described hereinafter.

Figure 6:
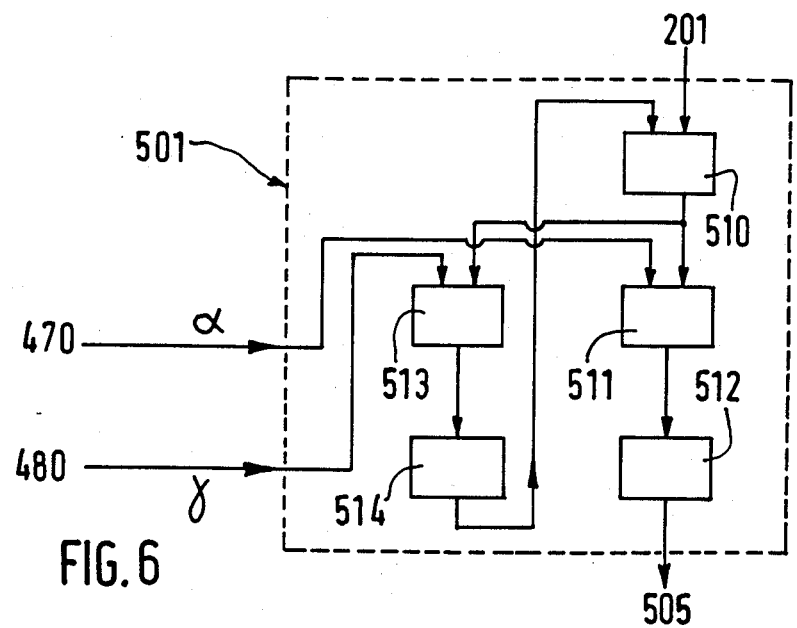
FIG. 6 shows an embodiment of one of the unpiling calculation circuits of the scintillation processing stage.

The output signals $X_m$, $Y_m$, $Z_m$, $E_m$ of the digital summing stage 200 are thus applied to a scintillation processing stage 500. As appears from FIG. 4, the stage 500 comprises four unpiling calculation circuits 501 to 504, two dividers 505 and 506, and one time realignment circuit 507. Because the four circuits 501 to 504 are identical, only one thereof will be described, for example the circuit 501. This circuit is shown in FIG. 6 and comprises a subtractor 510 whose first, positive input receives the output signal of the corresponding digital weighted sum forming device 201 (the circuits 501 to 504 correspond to the devices 201 to 204, respectively). The subtractor 510 is followed by a first multiplier 511 and a storage register 512, the output of which is that of the circuit 501. The subtractor 510 is also followed, connected parallel to the elements 511 and 512, by a second multiplier 513 and a second storage register 514. These multipliers may be replaced by a single multiplier circuit in association with a time multiplexer/demultiplexer. The negative input of the subtractor 510 is connected to the output of the storage register 514. The The second input of the multiplier 511 is connected to the output of a memory 470 which stores the coefficients $\alpha_j$ and that of the multiplier 513 is connected to the output of a memory 480 which stores the coefficient $\gamma_{j,k}$. For the scintillation j the outputs $\hat{X}$, $\hat{Y}$, $\hat{Z}$, $\hat{E}$ of the four unpiling calculation circuits 501 to 504 are given by the expressions:

$$\hat{X}_j = \alpha_j \left[ X_{m,j} - \sum_{k=j-1}^{k=j-q} \gamma_{k,j} \hat{X}_k \right] \tag{19}$$

$$\hat{Y}_j = \alpha_j \left[ Y_{m,j} - \sum_{k=j-1}^{k=j-q} \gamma_{k,j} \hat{Y}_k \right] \tag{20}$$

$$\hat{Z}_j = \alpha_j \left[ Z_{m,j} - \sum_{k=j-1}^{k=j-q} \gamma_{k,j} \hat{Z}_k \right] \tag{21}$$

-continued $$\hat{E}_j = \alpha_j \left[ E_{m,j} - \sum_{k=j-1}^{k=j-q} \gamma_{k,j} \hat{E}_k \right] \quad (22)$$

The elements of each circuit 501 to 504, for example the elements 510 to 514 of the circuit 501, form an upiling calculation circuit which is equivalent to that described in French patent application FR-A 2 552 233 and denoted by the reference numerals 120 to 160. The other three circuits 502 to 504 comprise the same elements as the circuit 501.

Figure 7:
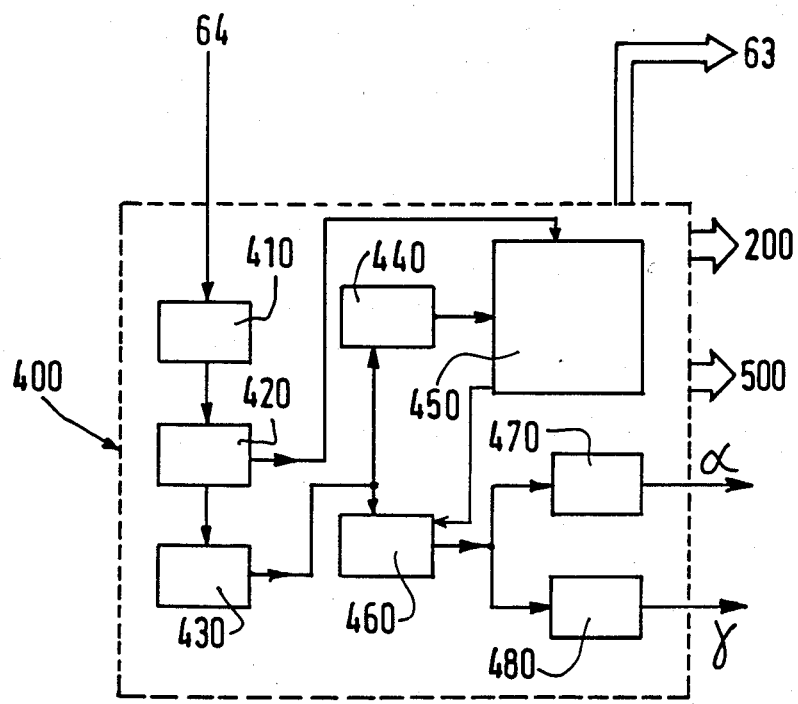
FIG. 7 shows an embodiment of the detection, sequencing and storage stage.

The output signal X of the unpiling calculation circuit 501 is applied to the first input of the divider 505 and the output signal Y of the circuit 502 is applied to the first input of the divider 506. The second input of each of these dividers is formed by the output Z of the unpiling calculation circuit 503. The three output signals of the processing stage, also being those of the processor, are formed by the output signal $x_j = \hat{X}_j/\hat{Z}_j$ of the divider 505, the output signals $x_j = \hat{Y}_j/\hat{Z}_j$ of the divider 506, and the output signal $E_j$ of the time realignment circuit 507 connected to the output of the unpiling calculation circuit 504. In the processor the detection, sequencing and storage stage 400 is also associated with these elements. The stage 400 is shown in FIG. 7 and comprises first of all a pulse start detector 410 which receives the output signal of the analog summing amplifier 64 (see FIGS. 2 and 4). The detector 410 is followed by a clock circuit 420 and a clock signal counter 430. The number thus counted is applied to a test circiuit 440 whose output signal is applied to the sequencing circuit 450. The latter circuit synchronizes the operations performed in the acquisition channels, the stage 200 and the stage 500, and validates the contents of a register 460 for storing the output signal of the counter 430, the register 460 being connected parallel to the test circuit 440. To the output of the register 460 there are connected the two memories 470 and 480 mentioned above with reference to FIG. 6 and storing the coefficients $\alpha_i$ and $\gamma_{j,k}$, respectively. The above elements 410 to 480 form a detection, sequencing, and storage stage which is similar to that disclosed in the Application FR-A 2 552 233.

Figure 8:
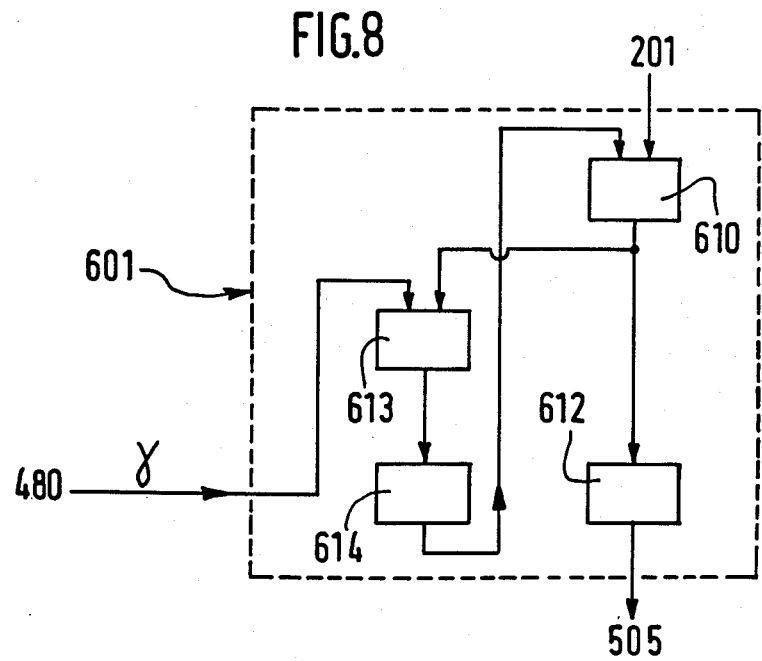
FIG. 8 shows an alternative embodiment of the unpiling calculation circuits shown in FIG. 6.
Figure 9:
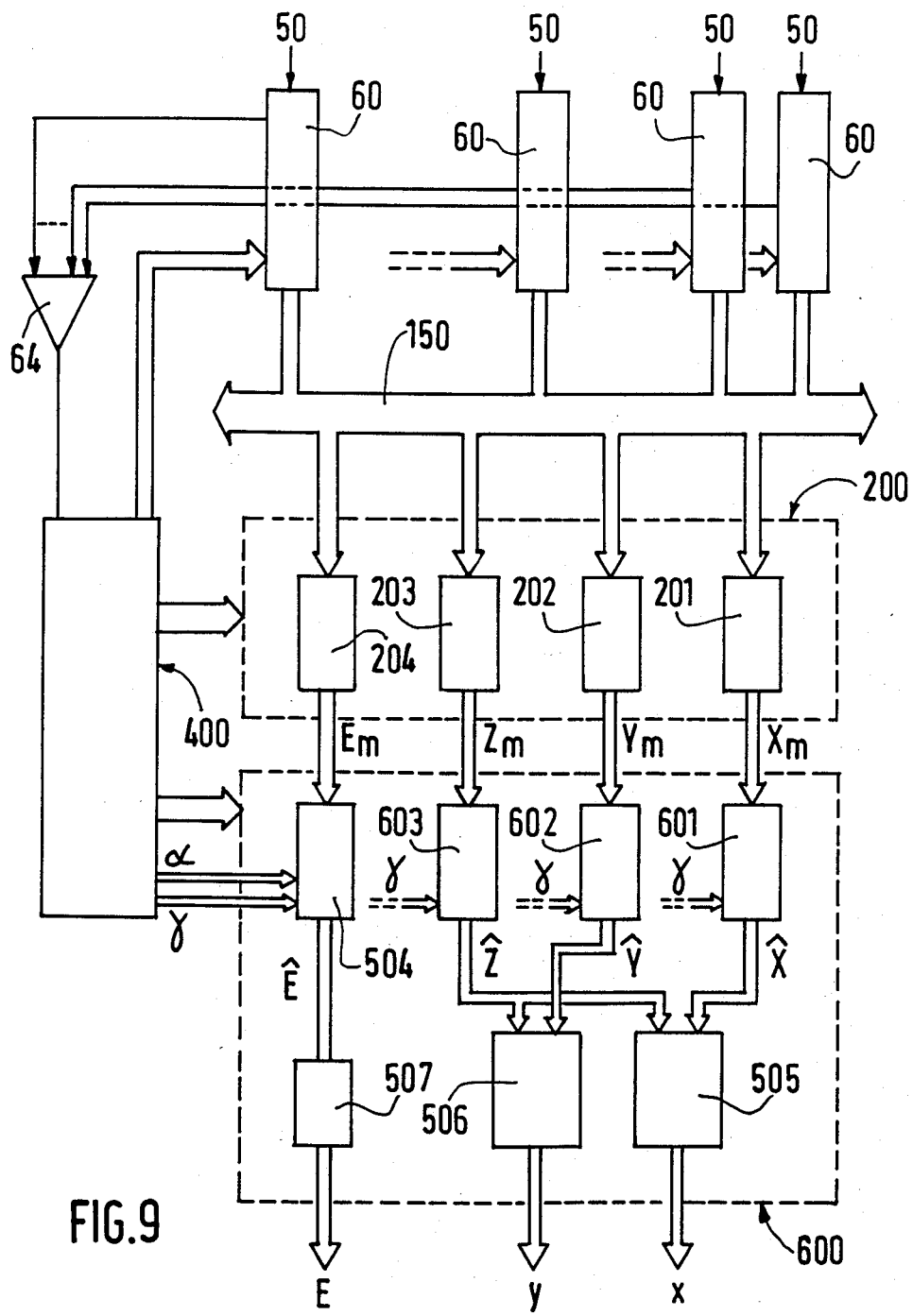
FIG. 9 shows a second embodiment of the processor of a camera in accordance with the invention, which includes the alternative embodiment of the unpiling calculation circuit shown in FIG. 8.

In a second embodiment, the calculation of the scintillation coordinates can be realized, without introducing extrapolation, in accordance with the following expressions:

$$\hat{X}_j = X_{m,j} - \sum_{k=j-1}^{k=j-q} C_{k,j} X'_k \quad (23)$$

$$\hat{Y}_j = Y_{m,j} - \sum_{k=j-1}^{k=j-q} C_{k,j} Y'_k \quad (24)$$

$$\hat{Z}_j = X_{m,j} - \sum_{k=j-1}^{k=j-q} C_{k,j} Z'_k \quad (25)$$

where always $x_j = \hat{X}'_j/\hat{Z}'_j$ and $\hat{y}_j = \hat{Y}'_j/\hat{Z}'_j$. The correction coefficient $C_{k,j}$ is a function of $\theta_{j,j+1}$ and $\theta_{k,j}$. In this embodiment, the scintillation processing stage is denoted by the reference numeral 600 and the three unpiling calculation circuits which receive the signals $X_m$, $Y_m$, $Z_m$ are modified by the omission of the multiplier 511. These circuits actually have the construction shown in FIG. 8 for an arbitary one of these circuits, for example the first one of the circuits 601 to 603. The circuit 601 comprises a substractor 610 which receives on its first input the output signal of the corresponding digital weighted sum forming device 201. The substractor 610 is followed on the one hand directly by a storage register 612 whose output is that of the unpiling calculation circuit as before, and on the other hand, in parallel, by a multiplier 613, followed by a storage register 614. The output signal of the register 614 is applied to the second input of the substractor 610, the other input of the multiplier 613 being connected to the output of the memory 480 included in the stage 400 for the storage of the coefficient $\gamma$. The other two circuits 602 and 603 comprise similar elements. The unpiling calculation circuit 504 remaining the same, the construction of the processor 100 is now as shown in FIG. 9. As before, the energy E is available on the output of the time realignment circuit 507.

Figure 10:
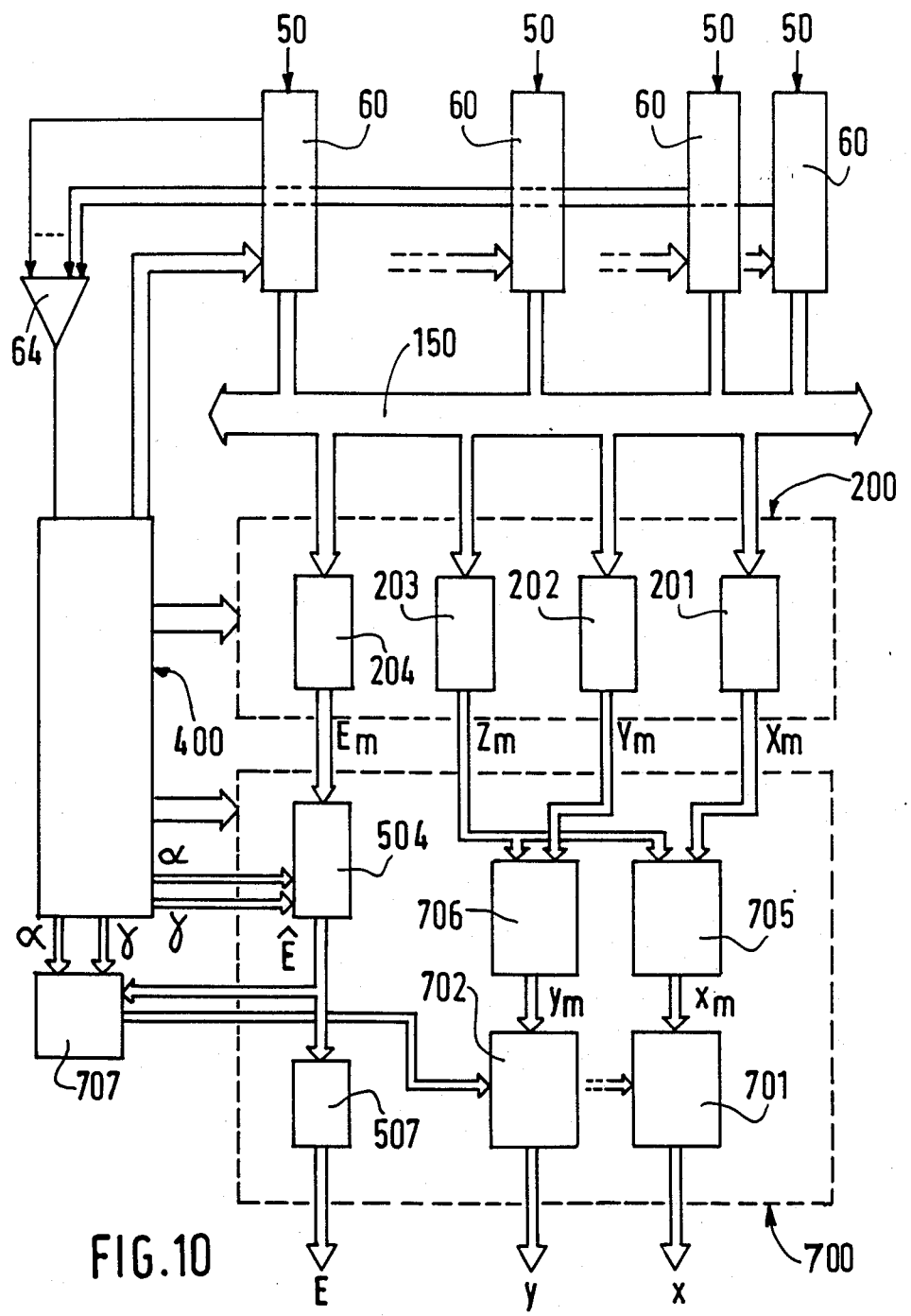
FIG. 10 shows a third embodiment of the processor of a scintillation camera in accordance with the invention which includes a third embodiment of the scintillation processing stage.

In a third embodiment as shown in FIG. 10, the processor 100 comprises a third type of scintillation processing stage which is denoted by the reference numeral 700. In this embodiment the unpiling operation is no longer performed on the output signals $X_m$, $Y_m$, $Z_m$ of the digital summing state 200 but on the coordinates $x_m$ and $y_m$, that to have been measured because for each scintillation j they are derived directly from the non-corrected quantities $X_m$, $Y_m$, $Z_m$ in accordance with the relations $x_{m,j} = X_{m,j}/Z_{m,j}$ and $y_{m,j} = Y_{m,j}/Z_{m,j}$. These signals $x_m$ and $y_m$ are obtained on the output of the two dividers 705 and 706, the divider 705 receiving the output signals of the digital summing devices 201 and 203, while the divider 706 receives those of the devices 202 and 203. The coordinates $x_j$, $y_j$ corresponding to the scintillation j are thus obtained on the outputs of the unpiling calculation circuits 701 and 702 on the basis of, on the one hand, the measured data and, on the other hand, on the basis of the already known coordinates $x_y$, $y_k$ of the preceding scintillations which disturb the scintillation j, in accordance with the following expressions:

$$x_j = x_{m,j} - \sum_{k=j-1}^{k=j-q} \Gamma_{k,j} (x_k - x_{m,j}) \quad (26)$$

$$y_j = y_{m,j} - \sum_{k=j-1}^{k=j-q} \Gamma_{k,j} (y_k - y_{m,j}) \quad (27)$$

The coefficients $\Gamma_{k,j}$, being a function of the measured time intervals $O_{j,j+1}$, $O_{k,j}$ and the ratios $\hat{E}_k/\hat{E}_j$, are calculated in an additional calculation circuit 707 which receives, on the one hand, the output signal $\hat{E}$ of the unpiling calculation circuit 504, which is always included in the processing stage, and, on the other hand, the coefficients $\alpha$ and $\gamma$ supplied by the detection, sequencing and storage stage 400. In the present embodiment the circuit 707 calculates, on the one hand, based on the values of $\hat{E}$ successively received, the successive ratios $\hat{E}_k/\hat{E}_j$ and, on the other hand, the products $\alpha_j \gamma_{k,j}$ on the basis of which the coefficients $\Gamma_{k,j}$ are evaluated in accordance with the relation $\Gamma_{k,j} = \alpha_j \gamma_{k,j} \hat{E}_k/\hat{E}_j$. The unpiling calculation circuits 701 and 702 have a configuration which is similar to that of the circuits 601 and 602. As before, the energy E is available on the output of the time realignment circuit 507.

It is to be understood that the invention is not restricted to the embodiments described and shown, for which many alternatives are feasible without departing from the scope of the invention. For example, there may be provided an amplitude rejection circuit for reducing the number of scintillations to be processed, so that calculations are performed only on selected scintillations (by means of a threshold, an energy window, etc.). On the other hand, there may be provided a time multiplex circuit so that only one divider need be used instead of two in each of the embodiments shown in the FIGS. 4, 9 and 10. A time multiplex circuit may also be provided in order to reduce the number of unpiling calculation circuits, so that only one unpiling calculation circuit need be used instead of the four circuits 501 to 504 in the embodiment shown in FIG. 4, the four circuits 601 to 603 and 504 in the embodiment shown in FIG. 9, or the three circuits 701, 702 and 504 in the embodiment shown in FIG. 10. The series of alternatives proposed in this section is also applicable to other embodiments according to the FIGS. 11 to 16.

Figure 11:
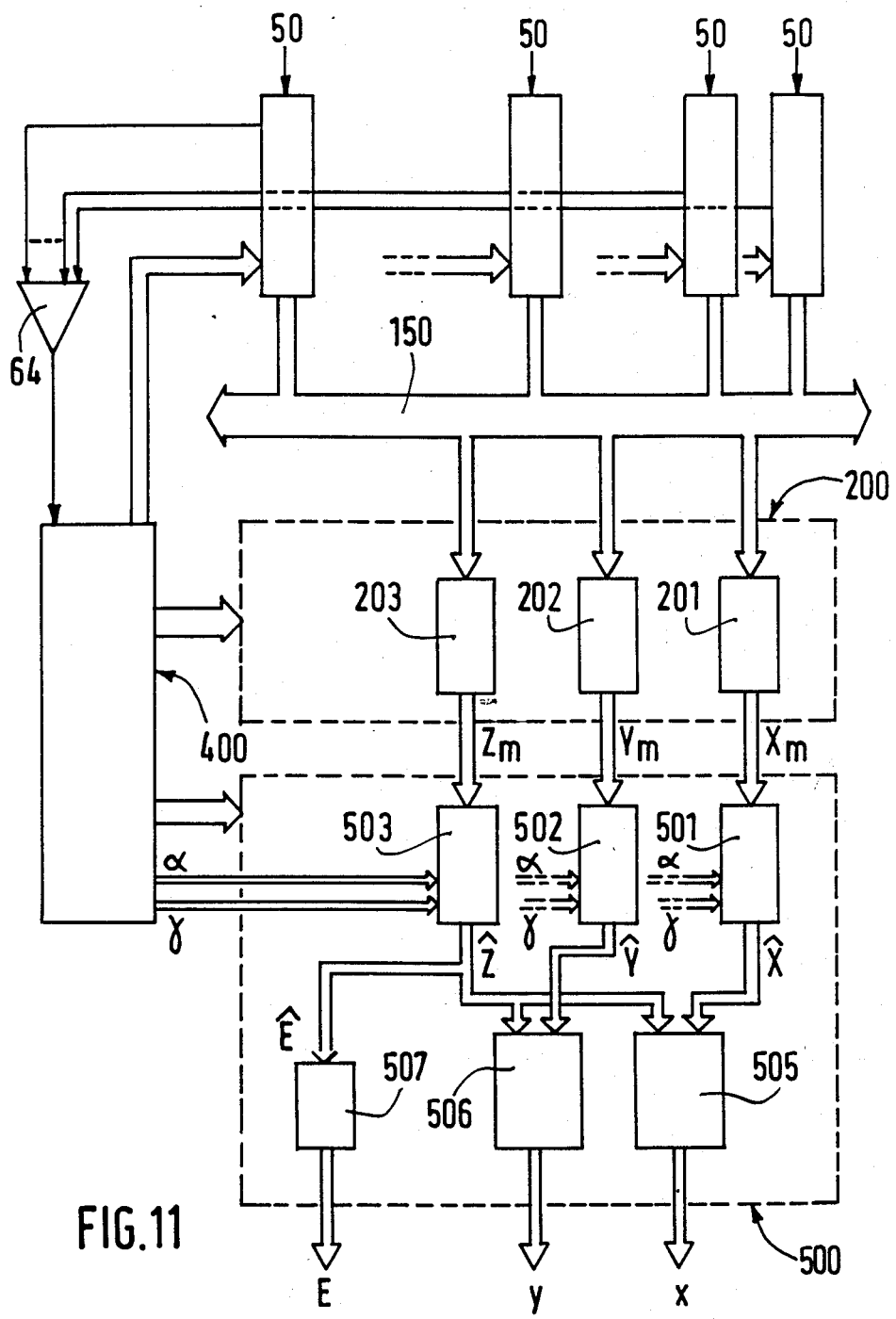
FIGS. 11 to 13 and 14 to 16 show, analogous to FIGS. 4, 9, 10, the modifications to the processor when only three calculation channels X, Y, Z or X, Y, E, respectively, are used.
Figure 12:
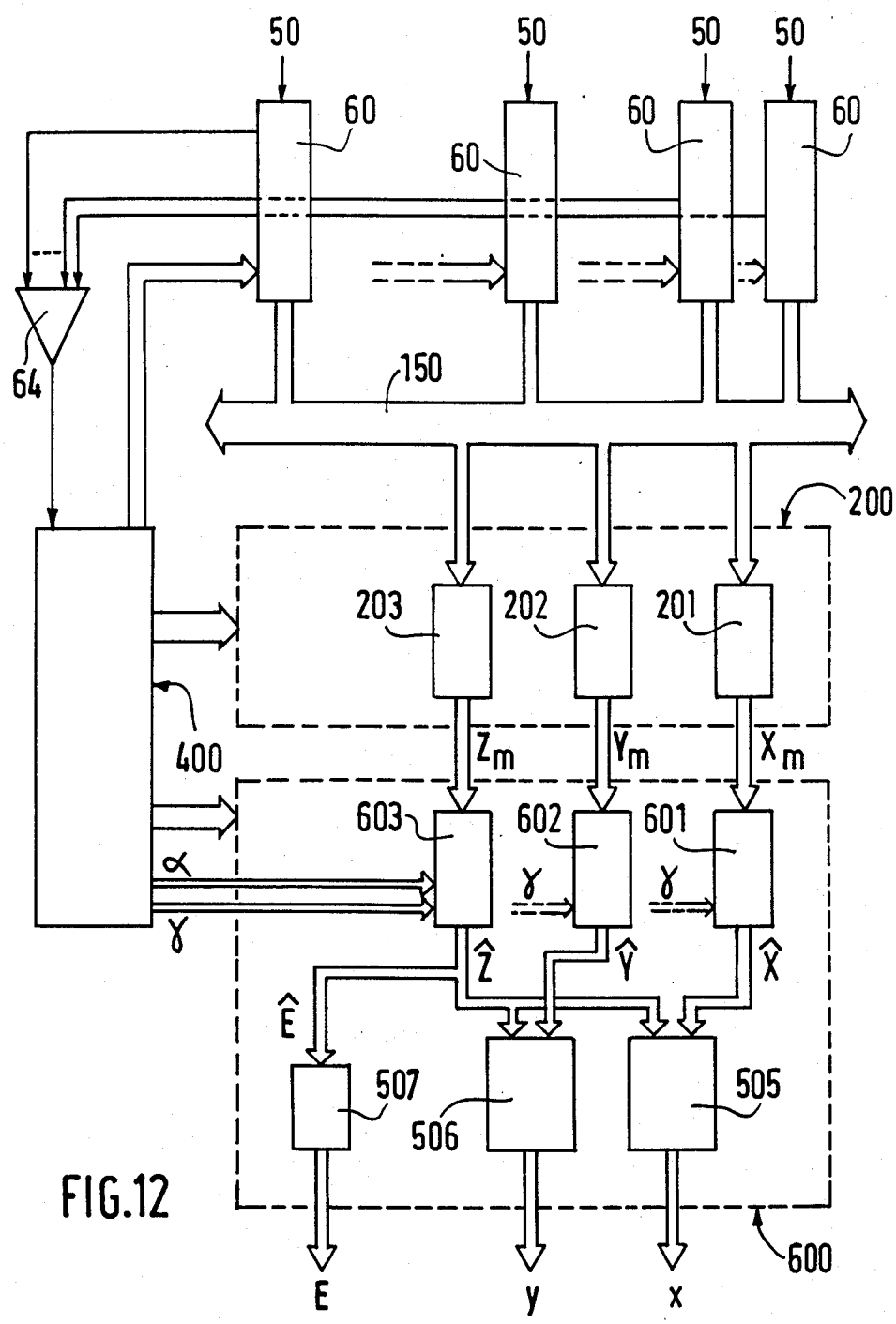
Figure 13:
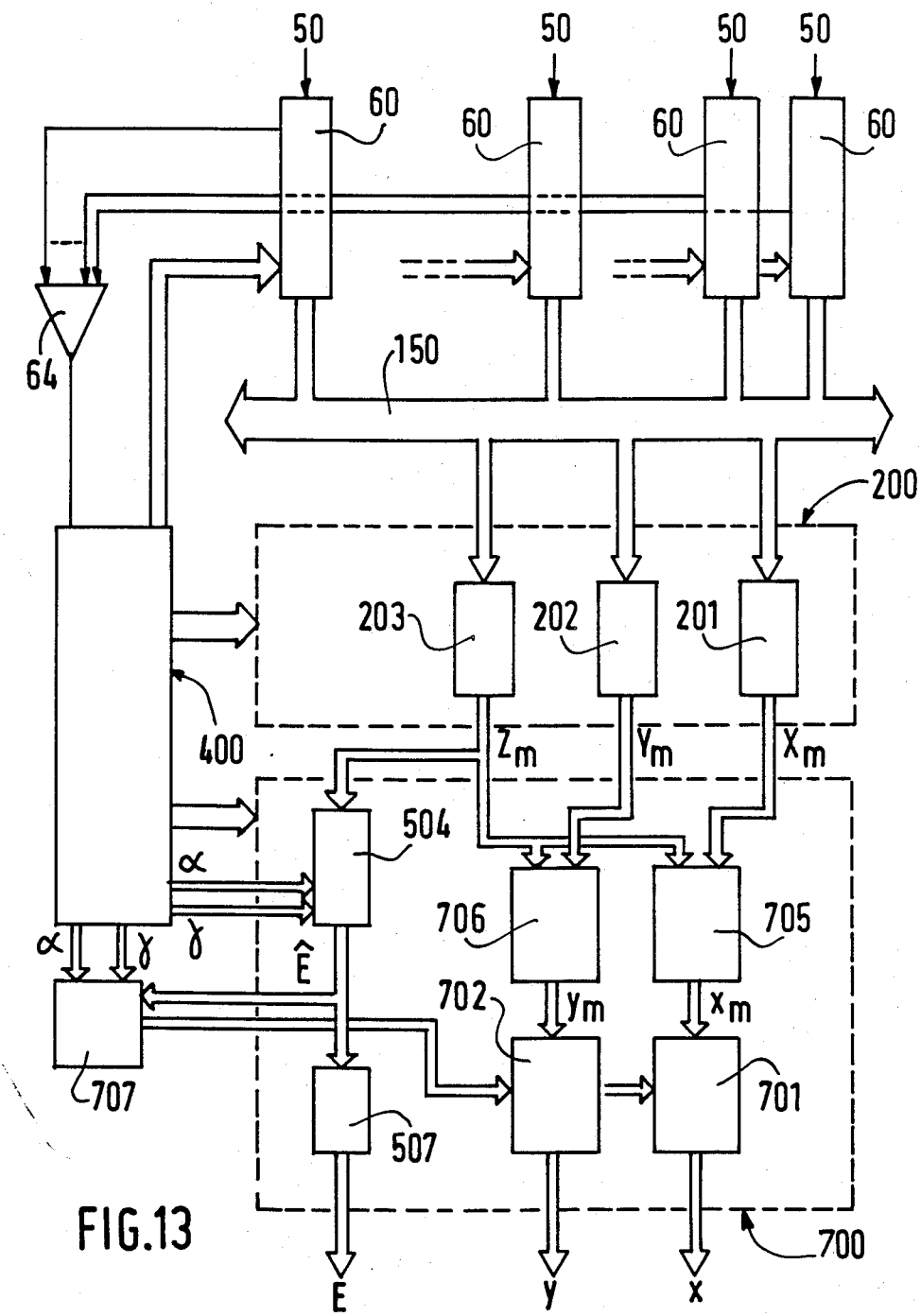
Figure 14:
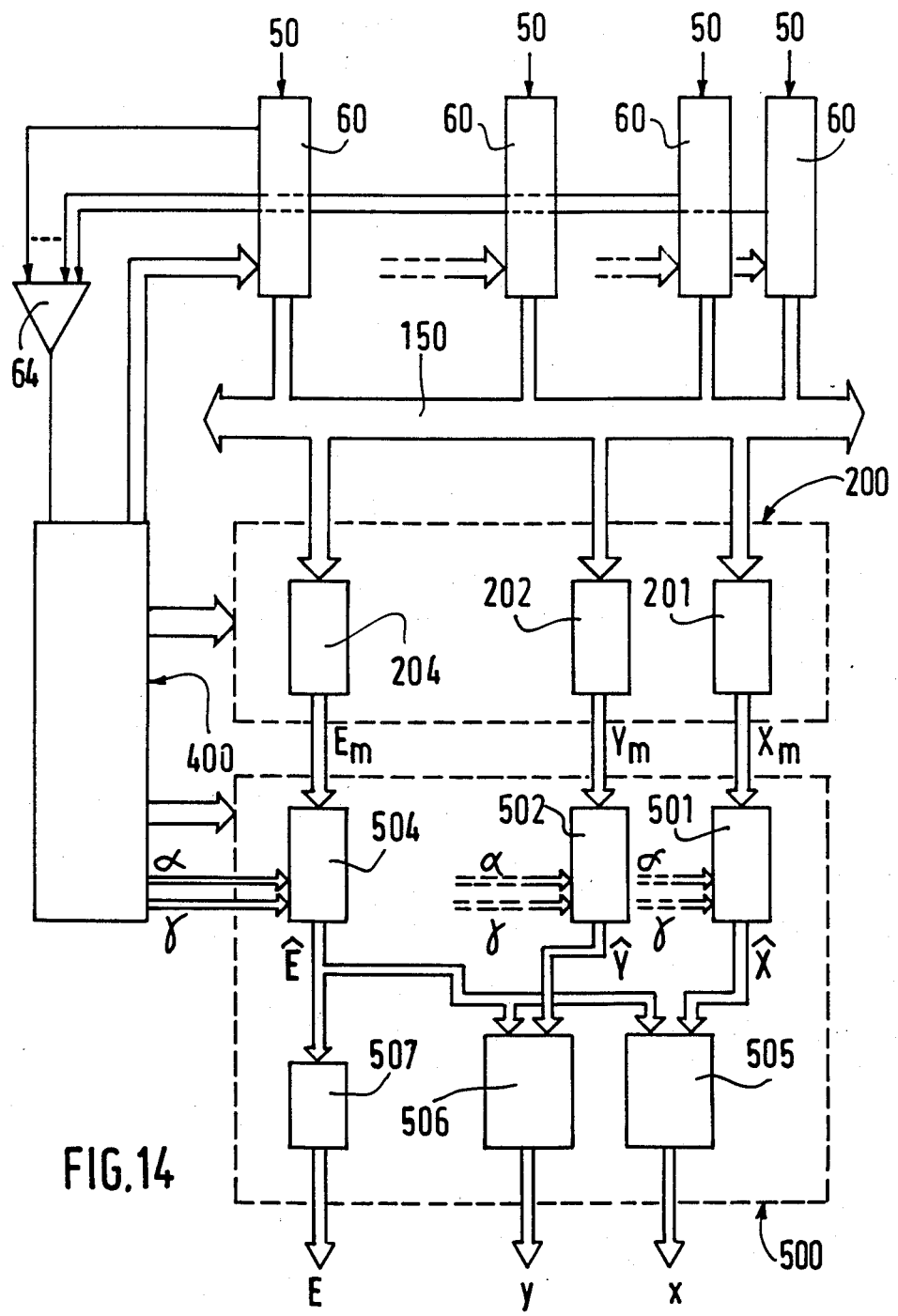
Figure 15:
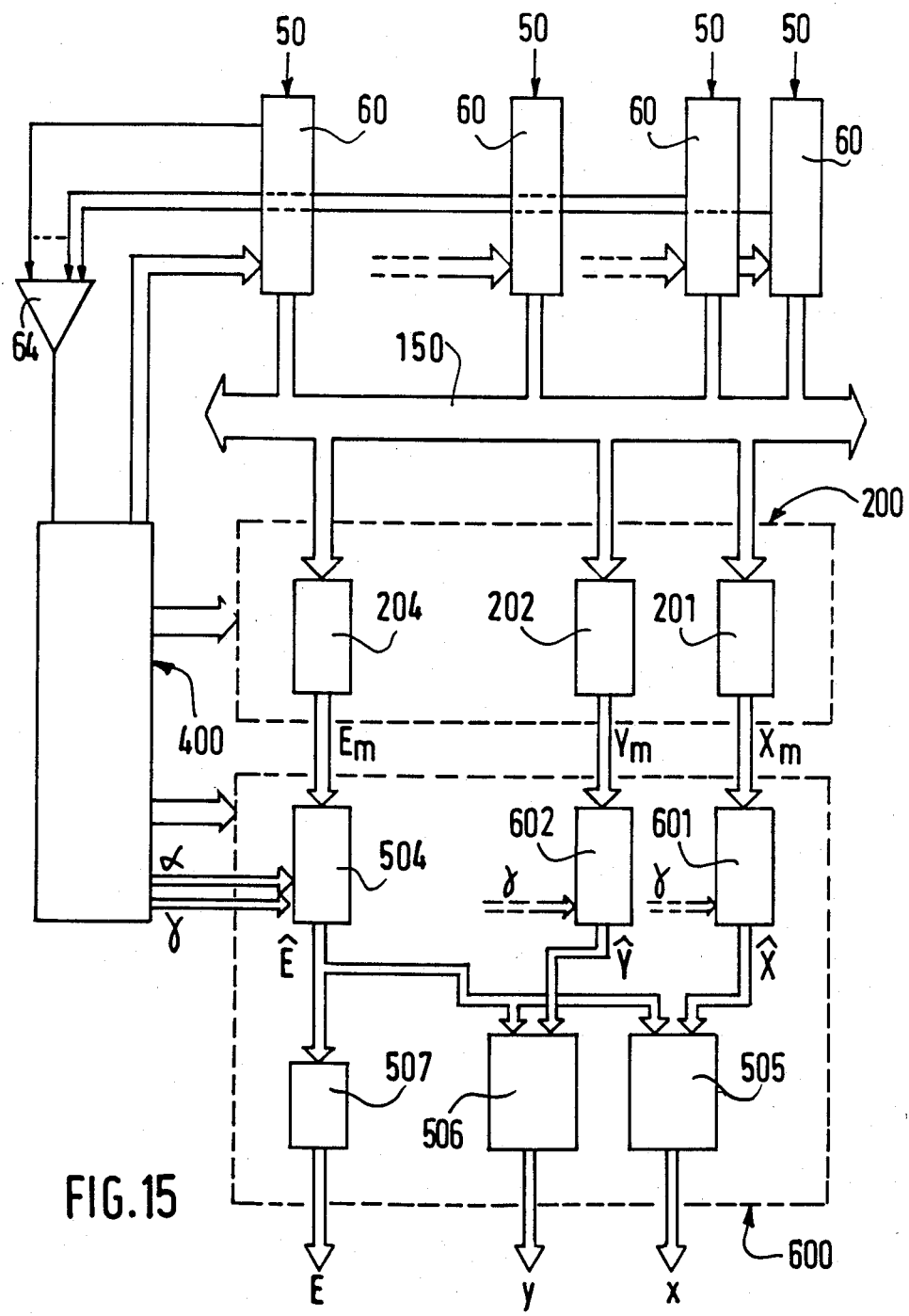
Figure 16:
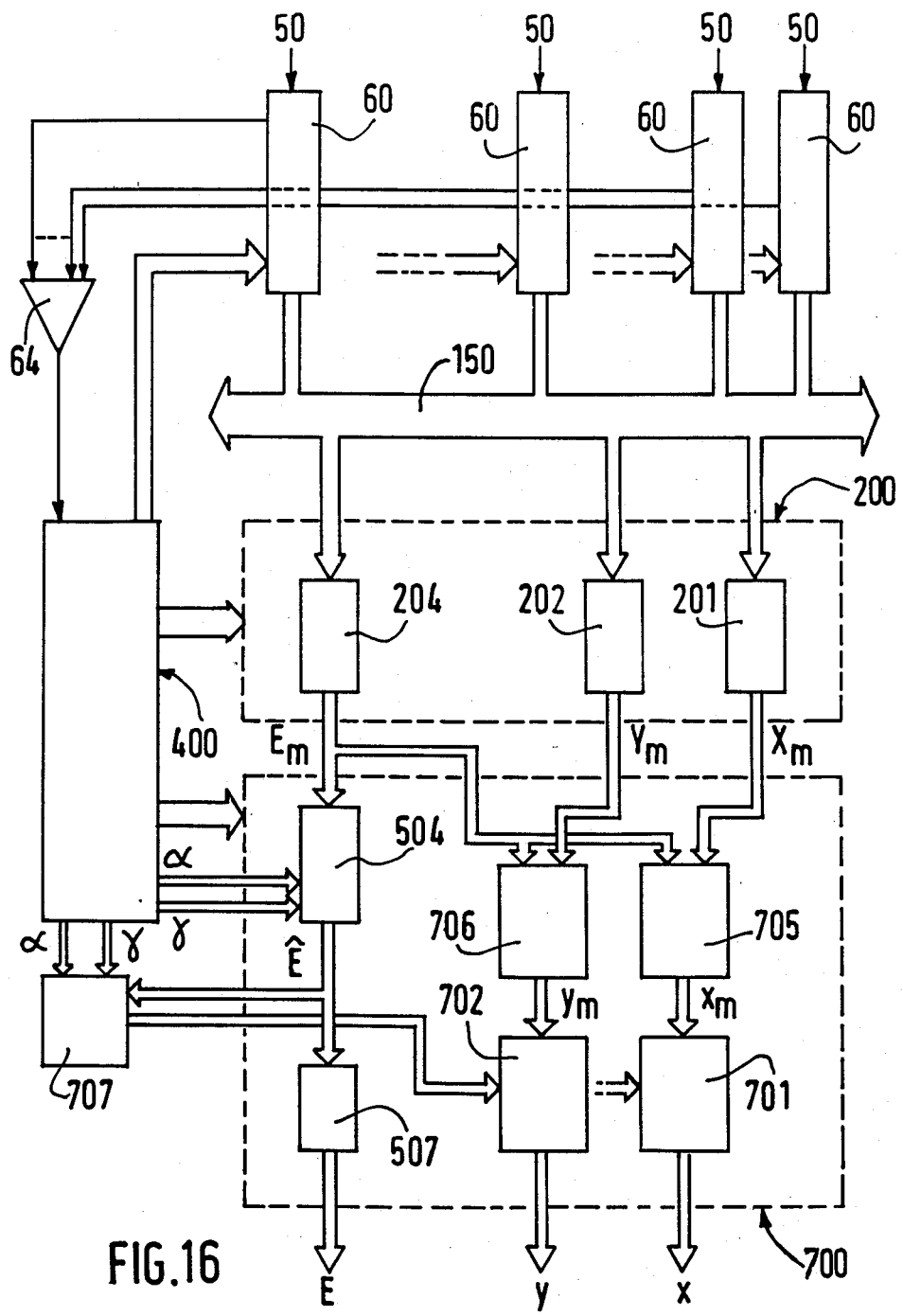

Taking into account the means for the correction of linearity errors and energy errors utilized by state of the art gamma cameras on the basis of the signals x, y and E on the output of the processor, Z or E can be used arbitrarily for the calculation of the coordinates. In that case only one of these quantities can be calculated and, depending on the choice made, the other quanitity can be deduced from calculations in which specific corrections for this choice are made and which are executed by these means. The digital summing stage 200 thus comprises only three digital weighted sum forming devices which supply the signals $X_m$, $Y_m$, $Z_m$ or $X_m$, $Y_m$, $E_m$, respectively. Moreover the scintillation processing stage 500 comprises only three unpiling calculation circuits. Similar to the FIGS. 4, 9 and 10, the FIGS. 11 to 13 show the modifications in the processor when only three channels X, Y, Z are used, while the FIGS. 14 to 16 show, again similar to the FIGS. 4, 9 and 10, the modifications of the processor when only three channels X, Y, E are used.

On the hand, it is also to be noted that, in order to enable operation at lower frequencies by controlling the scintillation rate, read/write FIFO memories which are controlled by the detection, sequencing and storage stage 400 can be arranged upstream from the digital summing stage.

Finally, it is to be noted that the bus 150 is either incorporated in the processor in which it forms the input or access element, or is connected thereto without being included therein.

Figure 17:
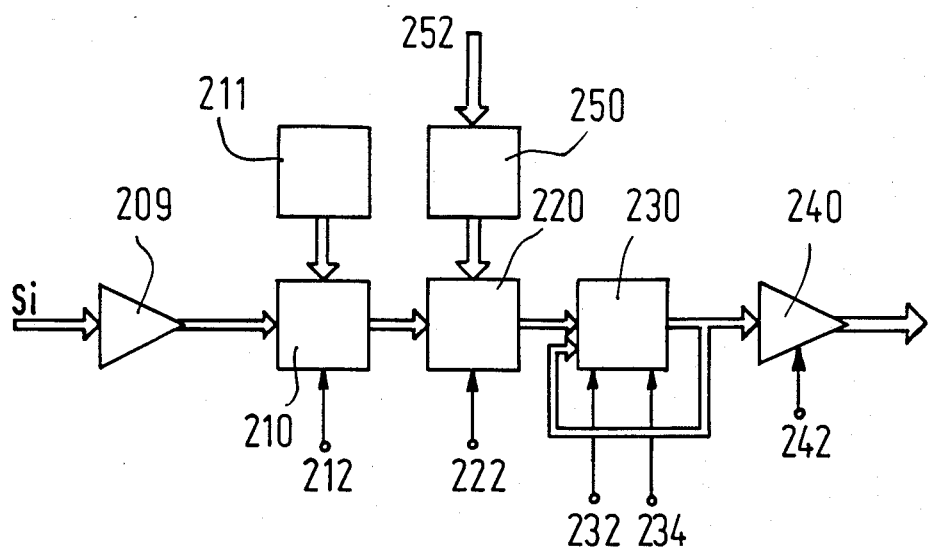
FIG. 17 shows an embodiment of a weighted sum calculation device in accordance with the invention.

The weighted sum forming device in accordance with the invention which is shown in FIG. 17 comprises a digital multiplier 220 which sequentially receives, via a first shaping circuit 209, the signals for which the weighted sum is to be formed, an adder/accumulator 230, and a second shaping circuit 240. The first shaping circuit 209 essentially serves to restore the shape of the signals which, upon arrival, may have been disturbed by the circuits previously traversed, while the second shaping circuit 240 realizes, in addition to shaping a current gain and/or impedance matching.

A digital memory 250 supplies the digital multiplier 220 with weighting coefficients to be applied to the signals. Commercially available integrated circuit digital multipliers (some of which also incorporate the adder/accumulator) can operate on signed as well as nonsigned data. Thus, either positive or negative weighting coefficients can be stored in the digital memory 250.

A processing circuit 210 is connected in series between the first shaping circuit 209 and the digital multiplier 220. The circuit 210 is controlled by a clock signal which will be described hereinafter. In the present embodiment a digital register 211 which contains a (possibly variable) threshold value (including the range to the value 0) is connected to the processing circuit 210. The processing circuit 210 may be formed simply by a circuit for eliminating signals which are below said threshold, or by a circuit having a more complex construction.

In a first embodiment, the digital memory 250 is a ROM. The coefficients stored therein are thus permanently fixed during manufacture. In a more elaborate embodiment, the memory 250 may be a RAM. The weighting coefficients can then be modified by means of an additional wire or microprogrammed circuit (microprocessor, microcomputer, . . . ).

Figure 18:
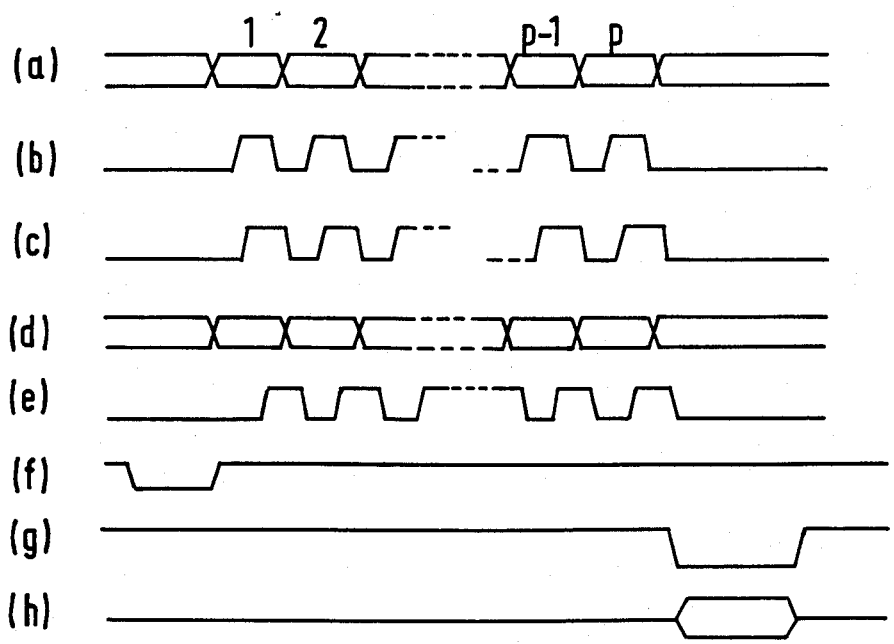
FIG. 18 shows the shape of various signals present at various points in the device shown in FIG. 17.

The operation of the weighted sum calculation device in accordance with the invention will be described hereinafter with reference to FIG. 18 which shows the shape of the signals present at various points in the device.

The digital signals present on the input of the shaping circuit 209 are denoted by the references $S_1, S_2, \ldots, S_i, \ldots, S_p, \ldots$ etc. and are shown in FIG. 18a. After shaping, these signals are received by the processing circuit 210 in the rhythm of the clock signal which is shown in FIG. 18b and with which the arrival of the digital signals $S_1, S_2, \ldots, S_p, \ldots$, is synchronized. This clock signal is received on the connection 212. In the described embodiment, the circuit 211 defines the threshold value and the output signals of the circuit 209 are applied, or not, to the digital multiplier 220, depending on whether there are larger than/equal to or smaller than said threshold value, respectively.

The signals present on the output of the processing circuit 210 are thus multiplied by respective weighting coefficients in the rhythm of a signal supplied on the connection 222. This signal is shown in FIG. 18c and is identical to that shown in FIG. 18b, but has been delayed with respect thereto by a period of time necessary for the transfer of the signals. The weighting coefficients are supplied by the memory 250 which is addressed in the rhythm of the signal which is shown in FIG. 18d, which is present on the connection 252 and which is in phase with the signal shown in FIG. 18a.

The adder/accumulator 230 thus performs a progressive summing operation on the weighted digital signals applied to its input, i.e. in the rhythm of the signal shown in FIG. 18e which is identical to that shown in FIG. 18b but which has also been delayed (in a manner other than in the preceding case) with respect thereto in order to compensate for the signal propagation time. The signal shown in FIG. 18e is received on the connection 232, a connection 234 being provided for the supply of a signal for resetting the adder/accumulator to zero (see FIG. 18f). Finally, FIG. 18g shows a validation signal which is applied to the connection 242 of the shaping circuit 240 and which makes the desired weighted sum signal available on the output of the circuit 240. This sum signal is shown in FIG. 18h (the state preceding its arrival is referred to as a high impedance state).

In the described embodiments or in the alternatives which can be realized within the scope of the invention, the weighted sum calculation device in accordance with the invention can find an important application in the field of scintillation cameras.

What is claimed is:

1. A scintillation camera comprising a collimator directing photons, a scintillation crystal converting each photon received from said collimator into a scintillation, a light guide for coupling said crystal to an entrance window of an array of p photodetectors, said photodetectors converting each scintillation into a current, p acquisition channels receiving output signals of said photodetectors and supplying p characteristic electric signals relating to the intensity of the scintillation and to each distance between each respective scintillation and each of the photo-detectors, and a processor supplying coordinates $x_j$ and $Y_j$ of a scintillation j and its associated energy $E_j$, characterized in that:

(A) said p acquisition channels sample said output signals of the photo-detectors, followed by A/D conversion of said samples and summing of said samples, and apply p digital signals to an output of said processor;

(B) said processor comprises:
  (i) a bus for transferring said p digital signals;
  (ii) a digital summing stage comprising four digital weighted sum forming devices supplying four digital signals $X_m$, $Y_m$, $Z_m$, $E_m$ on the basis of said output signals of said p acquisition channels;
  (iii) a scintillation processing stage including a plurality of unpiling calculation circuits and two dividers, said scintillation processing stage supplying three coordinate and energy signals x, y, E on the basis of said digital signals $X_m$, $Y_m$, $Z_m$, $E_m$; and (C) a detection, sequencing and storage stage is provided in order to supply various clock signals for synchronizing elements of said p acquisition channels and elements of said processor, and to supply correction coefficients for said scintillation processing stage, said detection, sequencing and storage stage receiving a signal corresponding to a sum of the p output signals of said photodetectors, and characterized in that said scintillation processing stage comprises four unpiling calculation circuits receiving said digiatl signals $X_m$, $Y_m$, $Z_m$, $E_m$, respectively and supplying four signals $\hat{X}$, $\hat{Y}$, $\hat{Z}$, $\hat{E}$, and wherein said two dividers supply two signals $x=\hat{X}/\hat{Z}$ and $y=\hat{Y}/\hat{Z}$, respectively, said three signals X, Y, E being formed by output signals, of a first divider of said two dividers, a second divider of said two dividers, and a time realignment circuit, respectively, said time realignment circuit receiving an output signal of one of said four unpiling calculation circuits, said correction coefficients being coefficients for correction by extrapolation and interpolation, $\alpha$ and $\gamma$, respectively, and intended for said four unpiling calculation circuits of said scintillation processing stage.

2. A scintillation camera as claimed in claim 1, characterized in that each of said four unpiling calculation circuits comprises a subtractor having a first input receiving an output signal of the corresponding conversion and integration device, said subtractor being followed by a first multiplier and a first storage register and by a second multiplier and a second storage register connected in parallel to said first multiplier and said first storage register, said second register having an output connected to a second input of said subtractor, said first multiplier having a second input connected to an output of a memory for storing the coefficient $\alpha$ and said second input of said second multiplier being connected to an output of a memory for storing the coefficient $\gamma$.

3. A scintillation camera as claimed in claim 2, characterized in that said multipliers are replaced by a single multiplier circuit associated with a time multiplexer/demultiplexer.

4. A scintillation camera as claimed in claim 1, characterized in that each of a first three unpiling calculation circuits of said plurality comprises a subtractor having a first input receiving an output signal of a corresponding digital summing stage, followed by a third storage register having an output of a corresponding unpiling calculation circuit, and, in parallel, by a third multiplier, followed by a fourth storage register, said fourth register having an output connected to a second input of said subtractor, said third multiplier having an output connected to an output of a memory for storing a coefficient $\gamma$.

5. A scintillation camera comprising a collimator directing photons, a scintillation crystal converting each photon received from said collimator into a scintillation, a light guide for coupling said crystal to an entrance window of an array of p photodetectors, said photodetectors converting each scintillation into a current, p acquisition channels receiving output signals of said photodetectors and supplying p characteristic electric signals relating to the intensity of the scintillation and to each distance between each respective scintillation and each of the photo-detectors, and a processor supplying coordinates $x_j$ and $y_j$ of a scintillation j and its associated energy $E_j$, characterized in that:

(A) said p acquisition channels sample said output signals of the photo-detectors, followed by A/D conversion of said samples and summing of said samples, and apply p digital signals to an output of said processor;

(B) said processor comprises:
  (i) a bus for transferring said p digital signals;
  (ii) a digital summing stage comprising four digital weighted sum forming devices supplying four digital signals $X_m$, $Y_m$, $Z_m$, $E_m$ on the basis of said output signals of said p acquisition channels;
  (iii) a scintillation processing stage including a plurality of unpiling calculation circuits and two dividers, said scintillation processing stage supplying three coordinate and energy signals x, y, E on the basis of said digital signals $X_m$, $Y_m$, $Z_m$, $E_m$; and (C) a detection, sequencing and storage stage is provided in order to supply various clock signals for synchronizing elements of said p acquisition channels and elements of said processor, and to supply correction coefficients for said scintillation processing stage, said detection, sequencing and storage stage receiving a signal corresponding to a sum of the p output of signals of said photodetectors, and characterized in that said scintillation processing stage comprises three unpiling calculation circuits, said two dividers, one time realignment circuit, and one additional calculation circuit, said two dividers receiving signals $X_m$, $Y_m$, $Z_m$ in order to supply two signals $x_m=X_m/Z_m$ and $y_m=Y_m/Z_m$, a first two of said unpiling calculation circuits receiving said signals $x_m$, $y_m$ and supplying said signals x, y, and a third of said unpiling calculation circuits receiving a signal $E_m$ and supplying the signal E, said additional calculation circuit receiving said signal E and said correction coefficients in order to supply said first and said second unpiling calculation circuits with an additional correction coefficient $\Gamma$.

6. A scintillation camera comprising a collimator directing photons, a scintillation crystal converting each photon received from said collimator into a scintillation, a light guide for coupling said crystal to an entrance window of an array of p photodetectors, said photodetectors converting each scintillation into a current, p analog acquisition channels receiving output signals of said photodetectors and supplying p characteristic electric signals relating to the intensity of the scintillation and to the distance between each respective scintillation and each of the photodetectors, and a processor supplying coordinates $x_j$ and $y_j$ of a scintillation j and its associated energy $E_j$, characterized in that:

(A) said p acquisition channels provide amplification, filtering and sampling of said output signals of said photodetectors, followed by A/D conversion of said samples and summing of said samples, and apply p digital signals to an output of said processor;

(B) said processor comprises:
  (i) a bus for transferring said p digital signals;
  (ii) a digital summing device comprising three digital weighted sum forming devices supplying digital signals $X_m, Y_m, Z_m$ or $X_m, Y_m, E_m$, respectively, on the basis of said output signals of said p acquisition channels;
  (iii) a scintillation processing stage including a plurality of unpiling calculation circuits and two dividers, said scintillation processing stage supplying, on the basis of said digital signals $X_m, Y_m, Z_m$ or $X_m, Y_m, E_m$, respectively, three coordinate and energy signals x, y, E; and (C) a detection, sequencing and storage stage is provided in order to supply various clock signals for synchronizing the elements of the p acquisition channels with the elements of said processor, and correction coefficients for said scintillation processing stage, said detection, sequencing and storage stage receiving a signal corresponding to a sum of the p output signals of said photodetectors, and characterized in that said scintillation processing stage comprises three unpiling calculation circuits receiving said digital signals $X_m, Y_m, Z_m$ or $X_m, Y_m, E_m$, respectively, and said unpiling calculation circuits supplying three signals $\hat{X}, \hat{Y}, \hat{Z}$ or $\hat{X}, \hat{Y}, \hat{E}$, respectively, and said two dividers supplying two signals $x=\hat{X}/\hat{Z}$ and $y=\hat{Y}/\hat{Z}$ or $x=\hat{X}/\hat{E}$ and $y=\hat{Y}/\hat{E}$ respectively, said three signals x, y, E being formed by output signals of a first divider of said two dividers, a second divider of said two dividers, and a time realignment circuit, respectively, said time realignment circuit receiving an output signal of said third unpiling calculation circuit, said correction coefficients being coefficients for correction by extrapolation and interpolation, $\alpha$ and $\gamma$, respectively, being intended for said three unpiling calculation circuits of said scintillation processing stage.

7. A scintillation camera as claimed in claim 6, characterized in that each of said three unpiling calculation circuits comprises a subtractor having a first input receiving an output signal of a corresponding conversion and integration device, said subtractor being followed by a first multiplier and a first storage register and by a second multiplier and a second storage register connected parallel to said first multiplier and said first storage register, said second register having an output connected to a second input of said subtractor, and said first multiplier having a second input connected to an output of a memory for storing said coefficient $\alpha$, and said second multiplier having a second input connected to an output of a memory for storing said coefficient $\gamma$.

8. A scintillation camera as claimed in claim 7, characterized in that said multipliers are replaced by a single multiplexer circuit associated with a time multiplexer/demultipler.

9. A scintillation camera as claimed in claim 6, characterized in that each of said three unpiling calculation circuits comprises a subtractor having a first input receiving an output signal of a corresponding digital summing device, followed by a third storage register having an output being that of the corresponding unpiling calculation circuit and, in parallel, by a third multiplier and a fourth storage register, said fourth storage register having an output connected to a second input of said subtractor, said third multiplier having an input connected to an output of a memory for storing said coefficient $\gamma$.

10. A scintillation camera as claimed in claim 1 or 6, characterized in that said two dividers are replaced by a single divider circuit associated with a time multiplexer/demultipler.

11. A scintillation camera as claimed in claim 1 or 6, characterized in that said plurality of unpiling calculation circuits are replaced by a single unpiling calculation circuit in association with a time multiplexer/demultiplexer.

12. A scintillation camera as claimed in claim 1 or 6, characterized in that an amplitude rejection circuit is provided for reducing the number of scintillations to be processed.

13. A scintillation camera as claimed in claim 1 or 6, characterized in that FIFO memories are connected either to an output of each of said p acquisition channels or upstream from each of said digital weighted sum forming devices.

14. A scintillation camera as claimed in claim 1 or 6, characterized in that said bus is individually connected to said processor without being included therein.

15. A scintillation camera as claimed in claim 1 or 6, characterized in that said weighted digital sum forming device comprises a series connection of a first shaping circuit sequentially receiving digital signals to form a weighted sum, a processing circuit, a digital multiplier having a first input receiving an output signal of said processing circuit, an adder/accumulator for successive output signals of said digital multiplier, and a second shaping circuit supplying said output signals of said weighted digital sum forming device, said processing circuit being controlled by a clock signal determining rhythm of presentation of said digital signals to an input of said device, a digital register being associated with said processing circuit in order to supply a threshold value thereto, a second input of said digital multiplier receiving an output signal of a digital memory serving to supply weighting coefficients to be applied to said digital signals.

16. A scintillation camera as claimed in claim 15, characterized in that said digital memory is a ROM.

17. A scintillation camera as claimed in claim 15, chracterized in that said digital memory is a RAM having an additional circuit for modifying said weighting coefficients.

18. A scintillation camera as claimed in claim 17, characterized in that an additional circuit for modifying said coefficients is a wired circuit.

19. A scintillation camera as claimed in claim 17, characterized in that said additional circuit for modifying said coefficients is a micro-programmed circuit including a microprocessor or a microcomputer.

20. A scintillation camera as claimed in claim 15, characterized in that said threshold value is variable.

21. A scintillation camera comprising a collimator directing photons, a scintillation crystal converting each photon received from said collimator into a scintillation, a light guide for coupling said crystal to an entrance window of an array of p photodetectors, said photodetectors converting each scintillation into a current, p acquisition channels receiving output signals of said photodetectors and supplying p characteristic electric signals relating to the intensity of the scintillation and to each distance between each respective scintillation and each of the photo-detectors, and a processor supplying coordinates $x_j$ and $y_j$ of a scintillation j and its associated energy $E_j$, characterized in that:
   (A) said p acquisition channels sample said output signals of the photo-detectors, followed by A/D conversion of said samples and summing of said samples, and apply p digital signals to an output of said processor;
   (B) said processor comprises:
      (i) a bus for transferring said p digital signals;
      (ii) a digital summing stage comprising four digital weighted sum forming devices supplying four digital signals $X_m$, $Y_m$, $Z_m$, $E_m$ on the basis of said output signals of said p acquisition channels;
      (iii) a scintillation processing stage including a plurality of unpiling calculation circuits and two dividers, said scintillation processing stage supplying three coordinate and energy signals x, y, E on the basis of said digital signals $X_m$, $Y_m$, $Z_m$, $E_m$; and
   (C) a detection, sequencing and storage stage is provided in order to supply various clock signals for synchronizing elements of said p acquisition channels and elements of said processor, and to supply correction coefficients for said scintillation processing stage, said detection, sequencing and storage stage receiving a signal corresponding to a sum of the p output signal of said photodetectors, and
characterized in that said scintillation processing stage comprises three unpiling calculation circuits, said two dividers, one time realignment circuit, and one additional calculation circuit, said two dividers receiving signals $X_m$, $Y_m$, $Z_m$ in order to supply two signals $x_m = X_m/Z_m$ and $y_m = Y_m/Z_m$, or receiving signals $X_m$, $Y_m$, $E_m$ in order to supply two signals $x_m = X_m/E_m$ and $y_m = Y_m/E_m$, respectively, the first two unpiling calculation circuits receiving said signals $x_m$, $y_m$ and supplying said signals x, y, and the third unpiling calculation circuit receiving said signal $Z_m$ or $E_m$ and supplying the signal E, said additional calculation circuit receiving said signal E and said correction coefficients in order to supply said first and said second unpiling calculation circuits with an additional correction coefficient $\Gamma$.

* * * * *